(12) United States Patent
Xie et al.

(10) Patent No.: US 11,023,073 B2
(45) Date of Patent: Jun. 1, 2021

(54) TOUCH PANEL, MANUFACTURING METHOD THEREOF, AND TOUCH DISPLAY DEVICE

(71) Applicants: BOE Technology Group Co., Ltd., Beijing (CN); Hefei Xinsheng Optoelectronics Technology Co., Ltd., Hefei (CN)

(72) Inventors: Xiaodong Xie, Beijing (CN); Ming Zhang, Beijing (CN); Ming Hu, Beijing (CN); Jing Wang, Beijing (CN); Qingpu Wang, Beijing (CN); Shuncheng Zhu, Beijing (CN)

(73) Assignees: BOE TECHNOLOGY GROUP CO., LTD., Beijing (CN); HEFEI XINSHENG OPTOELECTRONICS TECHNOLOGY CO., LTD, Hefei (CN)

( * ) Notice: Subject to any disclaimer, the term of this patent is extended or adjusted under 35 U.S.C. 154(b) by 32 days.

(21) Appl. No.: 15/752,275

(22) PCT Filed: Aug. 4, 2017

(86) PCT No.: PCT/CN2017/095980
§ 371 (c)(1),
(2) Date: Feb. 13, 2018

(87) PCT Pub. No.: WO2018/126672
PCT Pub. Date: Jul. 12, 2018

(65) Prior Publication Data
US 2020/0233530 A1    Jul. 23, 2020

(30) Foreign Application Priority Data
Jan. 3, 2017 (CN) .......................... 201710001984.9

(51) Int. Cl.
*G06F 3/041* (2006.01)
*G06F 3/044* (2006.01)

(52) U.S. Cl.
CPC .......... *G06F 3/04164* (2019.05); *G06F 3/044* (2013.01); *G06F 3/0443* (2019.05);
(Continued)

(58) Field of Classification Search
CPC .. G06F 3/0445; G06F 3/0448; G06F 3/04164; G06F 3/0443; G06F 3/044; G06F 2203/04103
See application file for complete search history.

(56) References Cited

U.S. PATENT DOCUMENTS

| 9,582,124 B2 * | 2/2017 | Han ...................... G06F 3/0446 |
| 2009/0091551 A1 * | 4/2009 | Hotelling .............. G06F 3/0416 345/174 |

(Continued)

FOREIGN PATENT DOCUMENTS

| CN | 102662521 A | 9/2012 |
| CN | 104298410 A | 1/2015 |

(Continued)

OTHER PUBLICATIONS

International Search Report for PCT Application No. PCT/CN2017/095980 dated Nov. 7, 2017.

(Continued)

*Primary Examiner* — Sejoon Ahn
(74) *Attorney, Agent, or Firm* — Fay Sharpe LLP (57) ABSTRACT

A touch panel, a manufacturing method thereof and a touch display device are provided in the field of display technology. The touch panel includes: a base substrate, and first touch electrodes and second touch electrodes that are disposed on the base substrate. The first touch electrodes are disposed in a center region of the base substrate, and the (Continued)

second touch electrodes are disposed in an edge region of the base substrate.

20 Claims, 7 Drawing Sheets

(52) U.S. Cl.
CPC .......... *G06F 3/0445* (2019.05); *G06F 3/0448* (2019.05); *G06F 2203/04103* (2013.01)

(56) References Cited

U.S. PATENT DOCUMENTS

| | | | |
|---|---|---|---|
| 2010/0265193 A1* | 10/2010 | Kung | G06F 3/044 345/173 |
| 2012/0019486 A1* | 1/2012 | Kim | G06F 3/044 345/176 |
| 2013/0169567 A1 | 7/2013 | Shih | |
| 2013/0207923 A1* | 8/2013 | Mohindra | G06F 3/044 345/174 |
| 2015/0169111 A1* | 6/2015 | Hashimoto | G06F 3/044 345/174 |
| 2015/0234495 A1* | 8/2015 | Lo | G06F 3/045 345/174 |
| 2016/0124563 A1 | 5/2016 | Wang et al. | |
| 2016/0178974 A1 | 6/2016 | Li et al. | |
| 2016/0313837 A1 | 10/2016 | Zhu et al. | |
| 2016/0370904 A1 | 12/2016 | Wang et al. | |
| 2018/0252954 A1* | 9/2018 | Liu | G02F 1/13338 |

FOREIGN PATENT DOCUMENTS

| | | |
|---|---|---|
| CN | 104484085 A | 4/2015 |
| CN | 104536197 A | 4/2015 |
| CN | 104750285 A | 7/2015 |
| CN | 105093725 A | 11/2015 |
| CN | 106681559 A | 5/2017 |
| JP | 2015228258 A | 12/2015 |

OTHER PUBLICATIONS

Second office action of Chinese application No. 201710001984.9 dated Jul. 12, 2019.

Third office action of Chinese application No. 201710001984.9 dated Apr. 8, 2020.

\* cited by examiner

TOUCH PANEL, MANUFACTURING METHOD THEREOF, AND TOUCH DISPLAY DEVICE

CROSS-REFERENCE OF RELATED APPLICATION

The present application is a 371 of PCT Application Ser. No. PCT/CN2017/095980 filed Apr. 8, 2017, which claims priority to Chinese Patent Application No.: 201710001984.9, filed with the State Intellectual Property Office on Jan. 3, 2017, which is incorporated herein by reference in its entirety.

TECHNICAL FIELD

The present disclosure relates to the field of display technology, and in particular to a touch panel, a manufacturing method thereof and a touch display device.

BACKGROUND

With the development of display technology, there have been various touch display devices. A touch display device includes a controller and a touch panel and a display panel that are laminated together.

SUMMARY

The present disclosure provides a touch panel, a manufacturing method thereof and a touch display device capable of solving the problem that the function of the touch display device is homogeneous. The technical solutions are as follows:

In a first aspect, there is provided a touch panel. The touch panel includes: a base substrate; and first touch electrodes and second touch electrodes that are disposed on the base substrate.

The first touch electrodes are disposed in the center region of the base substrate, and the second touch electrodes are disposed in the edge region of the base substrate.

In some embodiments, the touch panel further includes a first transparent insulating layer covering the base substrate and the first touch electrodes, and the second touch electrodes are disposed on the first transparent insulating layer.

In some embodiments, the second touch electrode is a strip electrode.

In some embodiments, the strip electrode has different widths at two ends in the extending direction thereof.

In some embodiments, the edge of the strip electrode is serrated.

In some embodiments, the first touch electrodes and the second touch electrodes are both connected to a controller.

In some embodiments, the touch panel further includes first electrode wires disposed on the base substrate, where the first electrode wires connect the first touch electrodes to the controller; and second electrode wires disposed on the base substrate, where the second electrode wires connect the second touch electrodes to the controller.

In some embodiments, the first touch electrodes include drive electrodes and sensing electrodes disposed in a cross-insulated manner; the first electrode wires include drive wires and sensing wires, wherein the drive wires connect the drive electrodes to the controller, and the sensing wires connect the sensing electrodes to the controller; the touch panel further includes a second transparent insulating layer covers the base substrate and the drive electrodes, wherein the sensing electrodes are disposed on the second transparent insulating layer.

In some embodiments, the first touch electrode and the second touch electrode contain indium tin oxide; and the first transparent insulating layer and the second transparent insulating layer contain transparent resin.

In some embodiments, the drive electrodes and the drive wires are disposed in the same layer. The sensing electrodes and the sensing wires are disposed in the same layer. The second touch electrodes and the second electrode wires are disposed in the same layer.

In a second aspect, there is provided a method for manufacturing a touch panel. The method includes: forming first touch electrodes and second touch electrodes on a base substrate, where the first touch electrodes are disposed in the center region of the base substrate, and the second touch electrodes are disposed in the edge region of the base substrate.

In some embodiments, forming the first touch electrodes and the second touch electrodes on the base substrate includes: forming the first touch electrodes in the center region of the base substrate; forming a first transparent insulating layer on the first touch electrodes and the base substrate; and forming the second touch electrodes on the first transparent insulating layer in the edge region of the base substrate.

In some embodiments, the second touch electrode is a strip electrode.

In some embodiments, the strip electrode has different widths at the two ends in the extending direction thereof.

In some embodiments, the edge of the strip electrode is serrated.

In some embodiments, the method further includes forming a controller. The first touch electrodes and the second touch electrodes are both connected to the controller.

In some embodiments, forming the first touch electrodes in the center region of the base substrate includes: forming the first touch electrodes and first electrode wires on the base substrate, the first touch electrodes being connected to the controller through the first electrode wires; and forming the second touch electrodes on the first transparent insulating layer in the edge region of the base substrate includes: forming the second touch electrodes and second electrode wires on the first transparent insulating layer, the second touch electrodes being connected to the controller through the second electrode wires.

In some embodiments, the first touch electrodes include drive electrodes and sensing electrodes disposed in a cross-insulated manner; the first electrode wires include drive wires connecting the drive electrodes to the controller and sensing wires connecting the sensing electrodes to the controller; and forming the first touch electrodes and the first electrode wires on the base substrate includes: forming the drive electrodes and the drive wires on the base substrate; forming a second transparent insulating layer on the drive electrodes and the drive wires; and forming the sensing electrodes and the sensing wires on the second transparent insulating layer.

In some embodiments, the first touch electrode and the second touch electrode contain indium tin oxide; and the first transparent insulating layer and the second transparent insulating layer contain transparent resin.

In a third aspect, there is provided a touch display device. The touch display device includes the touch panel described in the first aspect.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

The present disclosure will be described in further detail with reference to the enclosed drawings, to clearly present the objects, technique solutions, and advantages of the present disclosure.

Unless the context clearly indicates otherwise, the singular forms of the words as used herein and in the appended claims include the plural forms and vice versa. Thus, when referring to a singular form, it generally includes the plural form of the corresponding term. Similarly, the expressions "include" and "comprise" are to be construed as being inclusive and not exclusive. Likewise, the terms "include" and "or" should be construed as inclusive unless expressly prohibited herein. Where the term "example" is used herein, and particularly when it is used after a group of terms, the "example" is merely exemplary and illustrative and should not be considered as exclusive or extensive.

For the purposes of facilitating description in the following text, the terms "up," "down," "left," "right," "perpendicular," "horizontal," "top," "bottom" and their derivatives should refer to the disclosure. The terms "overlying," "above," "positioned on," or "positioned above" mean that a first element, such as a first structure, is present on a second element, such as a second structure, where intermediate elements such as interfacial structures may exist between the first element and the second element. The term "contact" means connecting a first element, such as a first structure, and a second element, such as a second structure, with or without other elements at the interface of the two elements.

In one implementation, a touch panel includes a base substrate and a touch layer formed on the base substrate. The touch layer includes touch electrodes formed in a center region of the base substrate and electrode wires formed in an edge region of the base substrate. The touch electrodes are connected to a controller through the electrode wires. The center region of the touch panel corresponds to the active area of a display panel, and the edge region of the touch panel corresponds to the inactive area of the display panel. The controller can collect electrical signals on the touch electrodes through the electrode wires to determine the position of the touch electrode touched by a user among the touch electrodes in the center region and control the active area of the display panel to display a corresponding image so that the center region of the touch display device (i.e. the center region of the touch panel) has a touch function.

In one implementation of the touch display device, only the center region has a touch function and the edge region does not have a touch function. Therefore, the touch function of the touch display device is limited.

Figure 1:
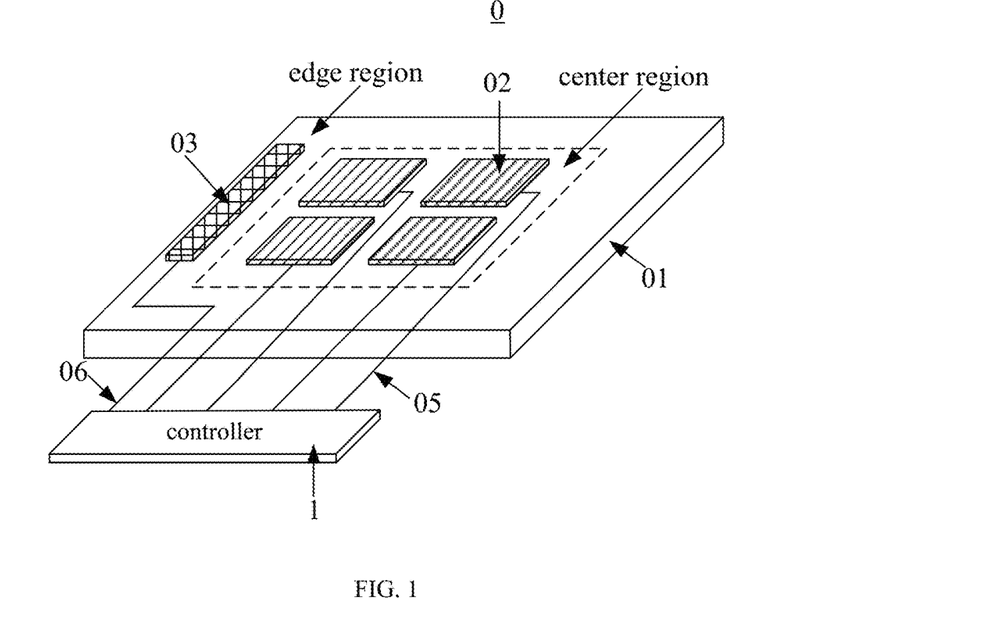
FIG. 1 is a structural schematic view of a touch panel provided in an embodiment of the present disclosure.

FIG. 1 is a structural schematic view of a touch panel 0 according to an embodiment of the present disclosure. As shown in FIG. 1, the touch panel 0 may include a base substrate 01 on which first touch electrodes 02 and second touch electrodes 03 are provided. The first touch electrodes 02 are disposed in a center region of the base substrate 01, and the second touch electrodes 03 are disposed in an edge region of the base substrate 01. The first touch electrodes 02 and the second touch electrodes 03 are both connected to a controller 1. In FIG. 1, the first touch electrode 02 and the second touch electrode 03 connecting to the same controller respectively through a first electrode wire 05 and a second electrode wire 06 is taken as an example. However, it is understood that the first touch electrode and the second touch electrode may also be connected to different controllers.

In summary, in the touch panel provided in the embodiments of the present disclosure, the first touch electrodes are disposed in the center region of the base substrate, and the second touch electrodes are disposed in the edge region of the base substrate, so that the electrical signals on the first touch electrodes and the second touch electrodes can be respectively detected. The center region and the edge region of the touch panel in the touch display device have touch functions. Therefore, the embodiments of the present disclosure can at least enrich the functions of the touch display device.

It should be noted that the controller 1 can be a control chip, and the controller 1 can be connected to the touch electrodes in the touch panel and collect the electrical signal on each touch electrode to determine the touched position on the touch panel based on the electrical signal on each touch electrode.

The center region in the embodiments of the present disclosure may be the same as the active area (AA) of the display panel in the related art. The edge region in the embodiments of the present disclosure may be the same as the inactive area of the display panel in the related art. For example, the center region may be a central region, and the center region may be rectangular. In this case, the edge region may be paperclip-shaped. The center region may also be circular. In this case, the edge region can be annular.

Figure 2:
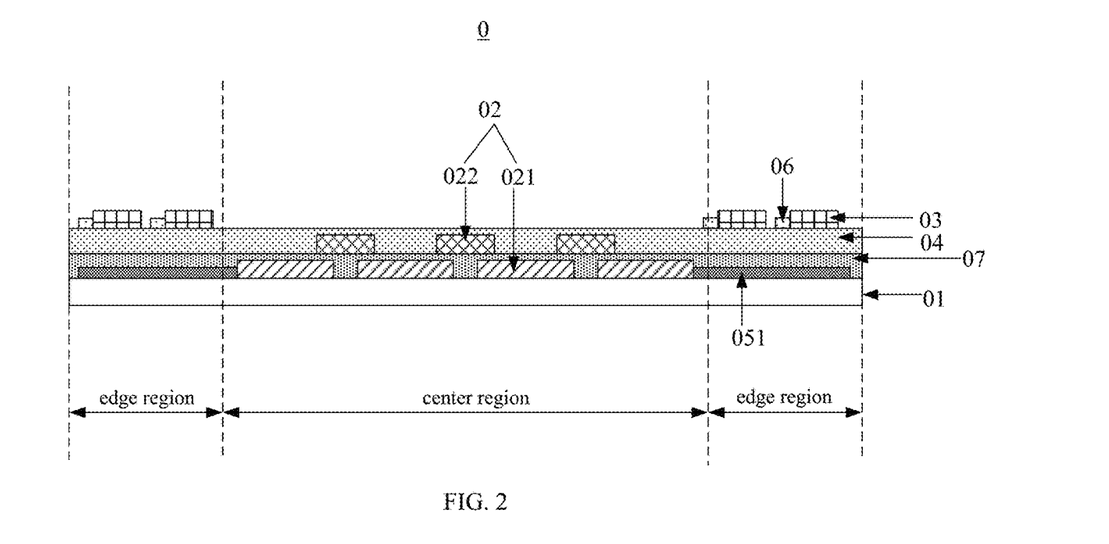
FIG. 2 is a structural schematic view of another touch panel provided in an embodiment of the present disclosure.

FIG. 2 is a structural schematic view of another touch panel 0 according to an embodiment of the present disclosure. As shown in FIG. 2, a first touch electrode 02 is disposed in a center region of a base substrate 01. A first transparent insulating layer 04 is disposed on the base substrate 01 provided with the first touch electrode 02, A second touch electrode 03 is disposed in an edge region of the base substrate 01 provided with the first transparent insulating layer 04. That is, signal crosstalk between the first touch electrode 02 and the second touch electrode 03 is prevented by the first transparent insulating layer 04 in the direction perpendicular to the base substrate 01. In the direction parallel to the base substrate 01, there is no overlapping portion between the first touch electrode 02 and the second touch electrode 03 since the first touch electrode 02 is disposed in the center region and the second touch electrode 03 is disposed in the edge region. Therefore, signal crosstalk between the first touch electrode 02 and the second touch electrode 03 can be prevented.

Figure 3:
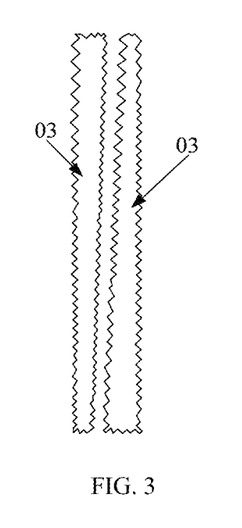
FIG. 3 is a structural schematic view of a second touch electrode provided in an embodiment of the present disclosure.

In some embodiments, due to the small area of the edge region, in order to reduce the number of leads connecting the second touch electrode 03 and the controller 1, the second touch electrode 03 may be a strip electrode. It should be noted that, the conductive wires on the base substrate for connecting the electrodes and the controller may be referred to as leads. FIG. 3 is a structural schematic diagram of a second touch electrode 03 according to an embodiment of the present disclosure. As shown in FIG. 3, the shape of the second touch electrode 03 may be a strip. Due to the large area of the strip electrode, the number of the second touch electrodes 03 in the edge region is small, and the number of the leads connecting the second touch electrodes 03 and the controller 1 is also small.

Further, the width of the strip electrode at one end along the extending direction thereof may be greater than the width at the other end, that is, the widths of the strip electrode at the two ends are different. When a user touches different regions of the strip electrode, the electrical signals on the strip electrode collected by the controller 1 are different. In this case, the controller 1 may determine the specific position touched by the user on the strip electrode according to the collected electrical signals, improving the touch accuracy of the second touch electrodes 03 under the premise of reducing the number of the leads of the second touch electrodes 03 in the edge region.

In some embodiments, with continued reference to FIG. 3, each of the plurality of strip electrodes (that is, the plurality of second touch electrodes 03) has different widths at the two ends along the extending direction thereof. The first strip electrode and the second strip electrode may be any two adjacent strip electrodes of the plurality of strip electrodes. The wider end of the first strip electrode is adjacent to the narrower end of the second strip electrode, and the narrower end of the first strip electrode is adjacent to the wider end of the second strip electrode.

For example, the edge of the strip electrode may be serrated. When the user's finger simultaneously touches the edges of two adjacent strip electrodes, if the user's finger is located in the right middle of two adjacent strip electrodes, the touch regions of the user's finger on the two adjacent strip electrodes are different since the edge of the strip electrode is serrated. Therefore, the areas of the touched regions on the two strip electrodes detected by the controller 1 are different, so that the controller 1 can more precisely determine the position touched by the user and further improve the touch accuracy of the second touch electrodes 03.

With continued reference to FIG. 2, the first touch electrodes 02 and first electrode wires may be disposed on the base substrate 01, and the first touch electrodes 02 are connected to the controller through the first electrode wires. In an embodiment, the first touch electrodes 02 and the first electrode wires may be referred to as a first touch layer. As shown in FIG. 2, the second touch electrodes 03 and second electrode wires 06 may be disposed on the base substrate 01 provided with the first transparent insulating layer 04, and the second touch electrodes 03 are connected to the controller through the second electrode wires 06. In an embodiment, the second touch electrodes 03 and the second electrode wires 06 may be referred to as a second touch layer. Here, the second touch electrodes 03 and the second electrode wires 06 are disposed in the same layer.

Figure 4:
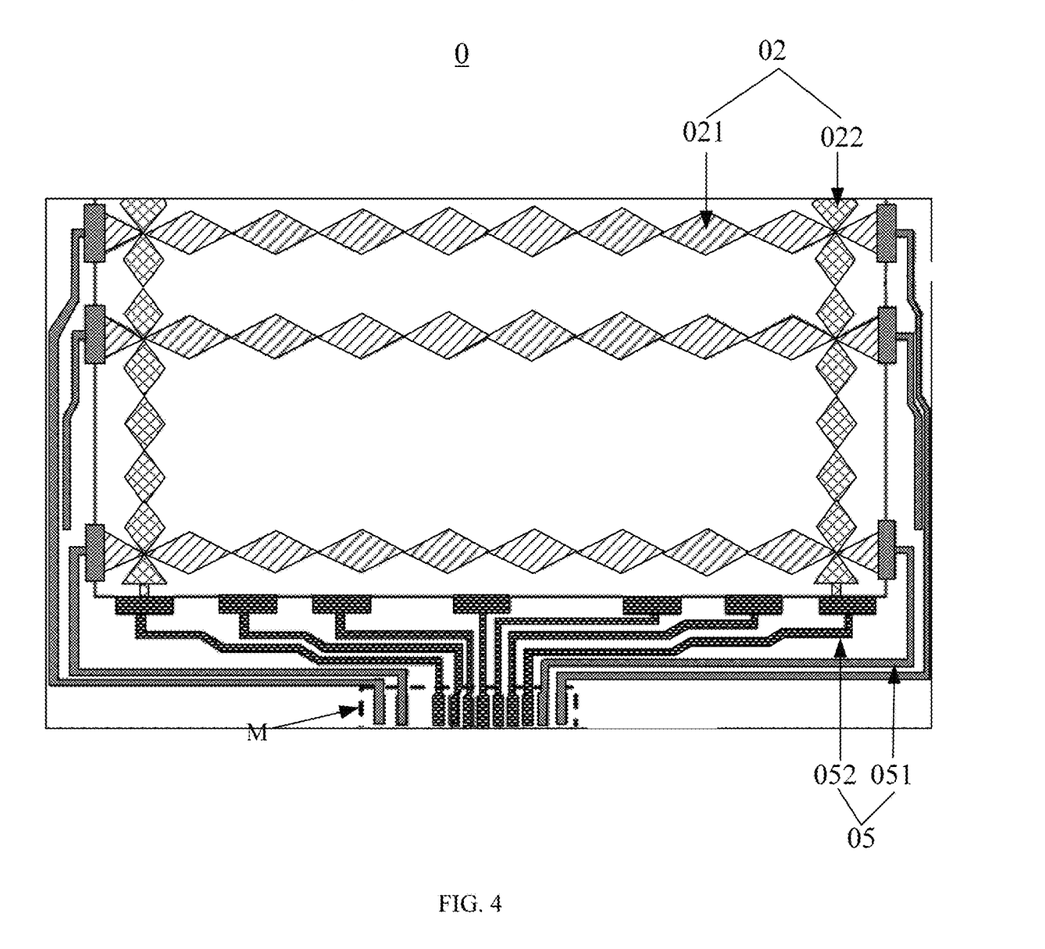
FIG. 4 is a partial structural schematic view of a touch panel provided in an embodiment of the present disclosure.

Further, FIG. 4 is a partial structure diagram of a touch panel 0 according to an embodiment of the present disclosure. FIG. 4 is a top view of a partial structure of the touch panel 0 and FIG. 4 merely shows a center region of the touch panel 0. FIG. 2 shows a cross-sectional view of the touch panel 0. With reference to FIGS. 2 and 4, the first touch electrodes 02 may include drive electrodes (also referred to as Tx electrode) 021 and sensing electrodes (also referred to as Rx electrode) 022 disposed in a cross-insulated manner (only some drive electrodes and some sensing electrodes are shown in FIG. 4). The first electrode wire 05 includes a drive wire 051 and a sensing wire 052. The drive electrode 021 is connected to the controller through the drive wire 051, and the sensing electrode 022 is connected to the controller through the sensing wire 052. The drive electrodes 021 and the drive wires 051 are disposed on the base substrate 01. A second transparent insulating layer 07 is disposed on the base substrate 01 provided with the drive electrodes 021 and the drive wires 051. The base substrate 01 provided with the second transparent insulating layer 07 is provided with the sensing electrodes 022 and the sensing wires 052. In the present disclosure, the drive electrodes 021 and the drive wires 051 may be referred to as a drive electrode layer, and the sensing electrodes 022 and the sensing wires 052 may be referred to as a sensing electrode layer. Here, the drive electrodes 021 and the drive wires 051 may be disposed in the same layer, and the sensing electrodes 022 and the sensing wires 052 may be disposed in the same layer.

Figure 5:
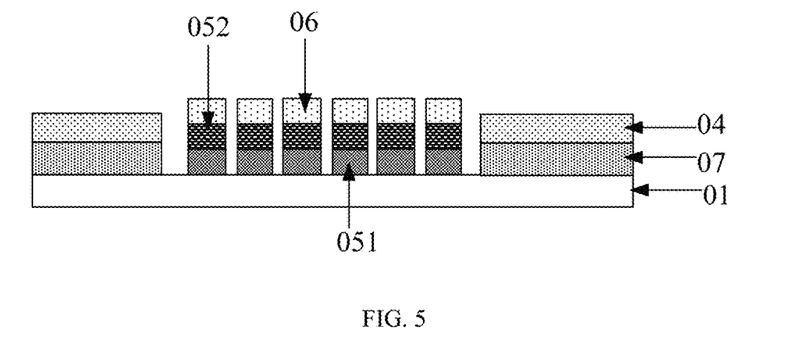
FIG. 5 is a cross-sectional view of a bonding region provided in an embodiment of the present disclosure.

FIG. 5 is a cross-sectional view of a bonding region according to an embodiment of the present disclosure. With reference to FIGS. 4 and 5, the drive wire 051, the sensing wire 052, and the second electrode wire 06 connecting the second touch electrode in the edge region may all converge to a bonding area M in FIG. 4.

That is, in the embodiment of the present disclosure, the first touch electrode on the base substrate includes two layers of electrodes, respectively drives electrode and sensing electrodes. The drive electrodes and the sensing electrodes are respectively connected to the controller. The method in which the first touch electrode realizes touch is mutual-capacitive touch. The second touch electrode on the base substrate includes only one layer of electrodes. Each of the second touch electrodes is connected to the controller. The method in which the second touch electrode realizes touch is self-capacitive touch.

In practice, the first touch electrode may also include only one layer of electrodes. Each of the first touch electrodes is connected to the controller. The method in which the first touch electrode realizes touch is self-capacitive touch. The second touch electrode may also include two layers of electrodes, respectively drive electrodes and sensing electrodes. The drive electrodes and the sensing electrodes are respectively connected to the controller. The method in which the second touch electrode realizes touch is mutual-capacitive touch. Alternatively, each of the first touch electrode and the second touch electrode includes one layer of electrodes. Each of the first touch electrodes and each of the second touch electrodes are connected to the controller. The method in which the first touch electrode and the second touch realize touch is self-capacitive touch. Alternatively, the first touch electrode and the second touch electrode both include two layers of electrodes. The first touch electrode includes drive electrodes and sensing electrodes. The second touch electrode also includes drive electrodes and sensing electrodes. The method in which first touch electrode and the second touch electrode realize touch is mutual-capacitive touch.

It should be noted that the touch panel provided in the embodiments of the present disclosure may be used for touch of a borderless display screen. That is, the touch panel provided in the embodiments of the present disclosure and the borderless display panel may be combined to obtain a borderless touch screen. The materials of the touch electrodes in the touch panel (such as the first touch electrodes and the second touch electrodes) may be a transparent conductive material (such as indium tin oxide). The materials of the transparent insulating layers can be a transparent insulating material (such as transparent resin). That is, all of the touch electrodes and the transparent insulating layers in the center region and the edge region of the touch panel are transparent materials, and thus the transparency of the touch panel is high. When the material of the touch electrode is indium tin oxide, the conductivity of the touch electrode is high, and the touch panel has high touch efficiency.

When the display screen is an embedded display screen, the base substrate in the touch panel may be a base substrate in the color filter substrate of the embedded display screen. When the display screen is a plug-in display screen, the base substrate in the touch panel may be disposed at the light-emitting side of the color filter substrate.

In summary, in the touch panel provided in the embodiments of the present disclosure, the center region of the base substrate is provided with the first touch electrodes, and the edge region of the base substrate is provided with the second touch electrodes, so that the electrical signals on the first touch electrodes and the second touch electrodes can be respectively detected. The center region and the edge region of the touch panel in the touch display device have functions. Therefore, the embodiments of the present disclosure can at least enrich the functions of the touch display device.

Figure 6:
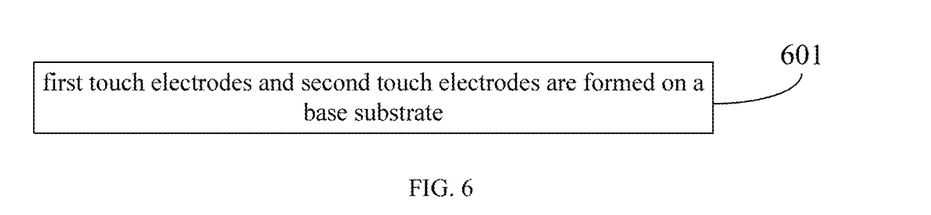
FIG. 6 is a flow chart of a method for manufacturing a touch panel provided in an embodiment of the present disclosure.

FIG. 6 is a flow chart of a method for manufacturing a touch panel according to an embodiment of the present disclosure. As shown in FIG. 6, the method for manufacturing a touch panel may include the following steps.

In step 601, first touch electrodes and second touch electrodes are formed on a base substrate.

The first touch electrodes are disposed in a center region of the base substrate, and the second touch electrodes are disposed in an edge region of the base substrate.

In summary, in the touch panel manufactured with the method for manufacturing a touch panel provided in the embodiments of the present disclosure, the center region of the base substrate is provided with the first touch electrodes, and the edge region of the base substrate is provided the second touch electrodes, so that electrical signals on the first touch electrodes and the second touch electrodes can be detected respectively. The center region and the edge region of the touch panel in the touch display device have touch functions, thereby enriching the functions of the touch display device. In one embodiment, the method for manufacturing a touch panel further includes forming a controller. The first touch electrodes and the second touch electrodes may be connected to the same controller, or may be connected to different controllers.

Figure 7:
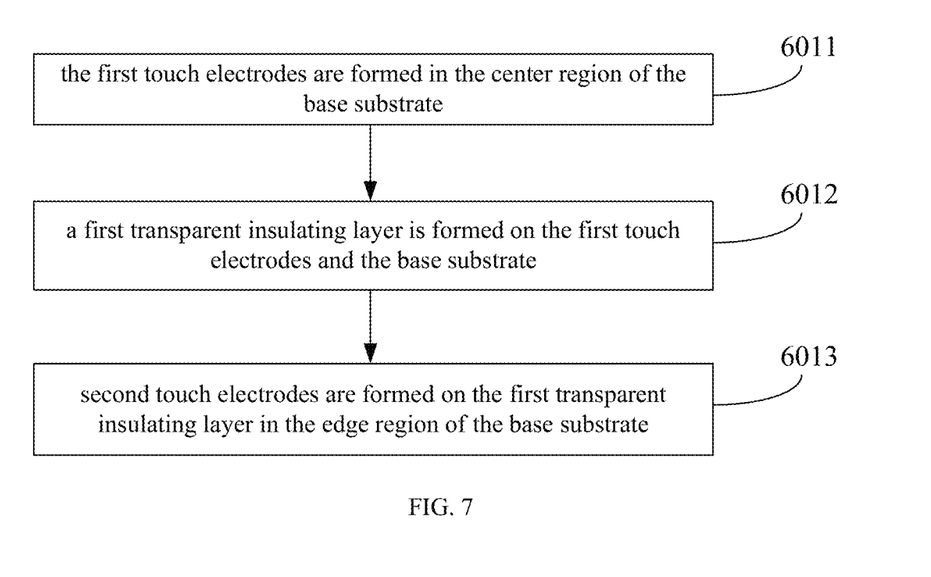
FIG. 7 is a flow chart of a method for forming a touch electrode provided in an embodiment of the present disclosure.

As shown in FIG. 7, step 601 may include the following steps.

In step 6011, the first touch electrodes are formed in the center region of the base substrate.

When forming the first touch electrodes on the base substrate, the first touch electrodes and first electrode wires may be firstly formed on the base substrate, and the first touch electrodes are connected to the controller through the first electrode wires. In an embodiment, the first touch electrodes may include drive electrodes and sensing electrodes disposed in a cross-insulated manner. The first electrode wires include drive wires and sensing wires. The drive electrodes are connected to the controller through the drive wires. The sensing electrodes are connected to the controller through the sensing wires. In the present disclosure, the first touch electrodes and the first electrode wires may be referred to as a first touch layer.

Figure 8:
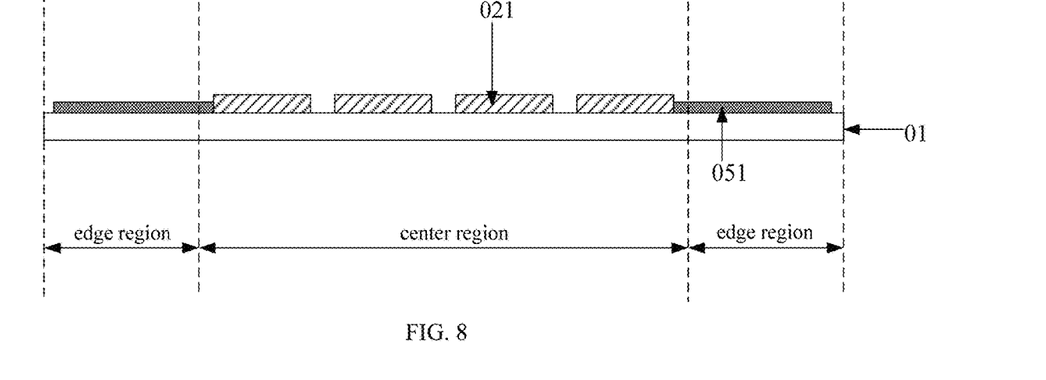
FIG. 8 is a partial structural schematic view of another touch panel provided in an embodiment of the present disclosure.

When forming the first touch electrodes and the first electrode wires on the base substrate, the following methods may be adopted:

As shown in FIG. 8, the drive electrodes 021 and the drive wires 051 are first formed on the base substrate 01. For example, the materials of the drive electrode 021 and the drive wire 051 may be the same.

Exemplarily, when forming the drive electrode layer, a layer of drive electrode material may be deposited on the base substrate 01 with the method of coating, magnetron sputtering, thermal evaporation or plasma enhanced chemical vapor deposition (PECVD) or the like to obtain a drive electrode material layer. Then the drive electrode material layer is processed through a single patterning process to obtain the drive electrodes 021 and the drive wires 051. The single patterning process includes: photoresist coating, exposure, developing, etching and photoresist stripping. Therefore, processing the metal material layer by the single patterning process includes: coating a layer of photoresist on the metal material layer and then exposing the photoresist using a mask so that the photoresist forms a completely exposed region and a non-exposed region, and then a developing process is performed to remove the photoresist in the completely exposed region and retain the photoresist in the non-exposed region. Then the corresponding region of the completely exposed region on the metal material layer is etched. After the etching, the photoresist in the non-exposed region is stripped to obtain the drive electrodes and the drive wires.

Figure 9:
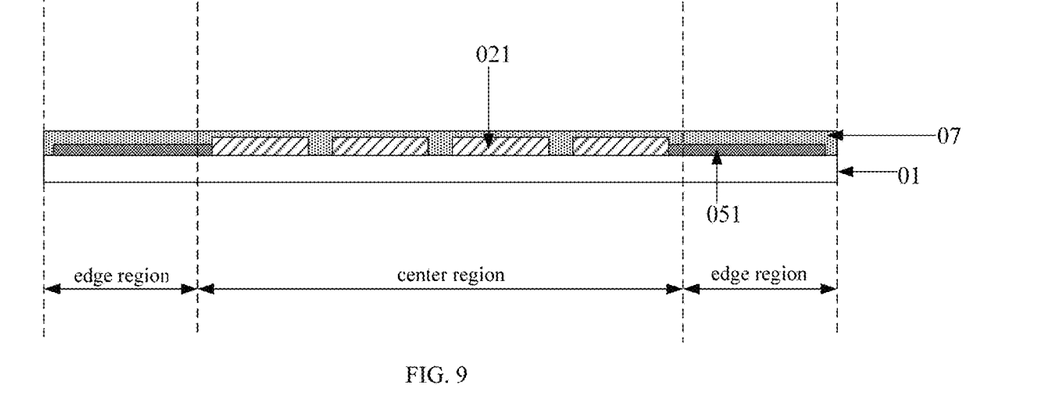
FIG. 9 is a partial structural schematic view of yet another touch panel provided in an embodiment of the present disclosure.

Next, as shown in FIG. 9, a second transparent insulating layer 07 is formed on the drive electrodes 021 and the drive wires 051.

Figure 10:
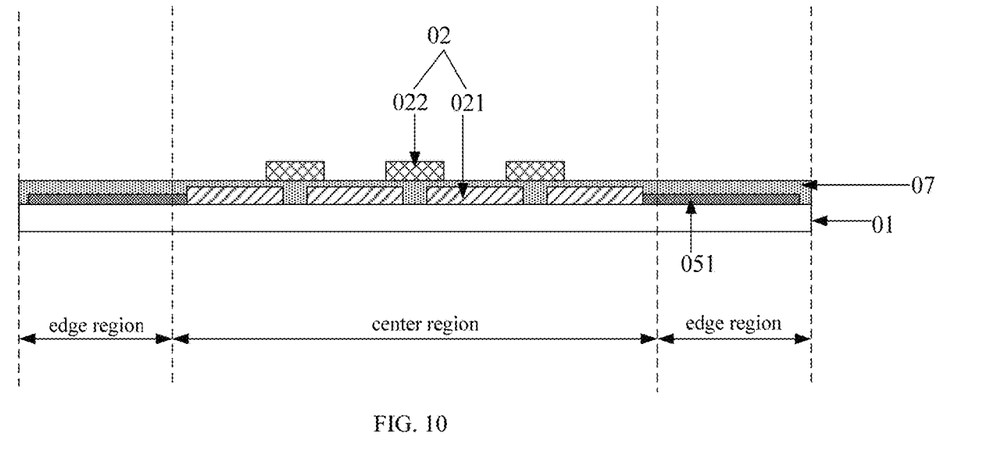
FIG. 10 is a partial structural schematic view of yet another touch panel provided in an embodiment of the present disclosure.

Finally, as shown in FIG. 10, sensing electrodes 022 and sense wires (not shown in FIG. 10) are formed on the base substrate 01 on which the second transparent insulating layer 07 is formed. The drive electrodes 021 and the sensing electrodes 022 form a first touch electrode 02. For example, the materials of the sensing electrode 022 and the sensing wire 052 may be the same.

In step 6012, a first transparent insulating layer is formed on the first touch electrodes and the base substrate.

Figure 11:
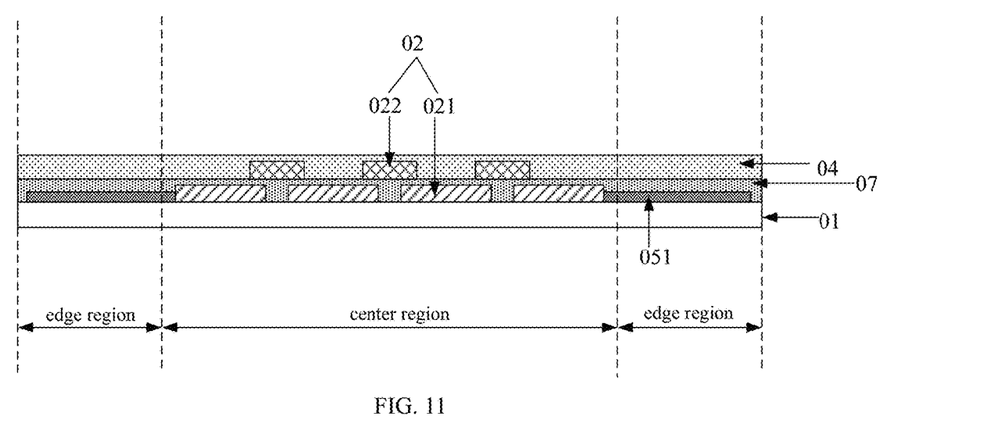
FIG. 11 is a partial structural schematic view of a touch panel provided in another embodiment of the present disclosure.

As shown in FIG. 11, in step 6012, a first transparent insulating layer 04 may be formed on the first touch electrodes 02 and the base substrate 01.

In step 6013, second touch electrodes are formed on the first transparent insulating layer in the edge region of the base substrate.

As shown in FIG. 2, in step 6013, second touch electrodes 03 and second electrode wires 06 may be formed on the first transparent insulating layer 04 in the edge region of the base substrate 01. The second touch electrodes 03 are connected to the controller through the second electrode wires 06. For example, the materials of the second touch electrode 03 and the second electrode wire 06 may be the same. In the present disclosure, the second touch electrodes 03 and the second electrode wires 06 may be referred to as a second touch layer.

In some embodiments, due to the small area of the edge region, in order to reduce the number of the leads connecting the second touch electrodes 03 disposed in the edge region and the controller, the second touch electrode 03 may be a strip electrode. FIG. 3 is a structural schematic diagram of a second touch electrode 03 provided according to an embodiment of the present disclosure. As shown in FIG. 3, the shape of the second touch electrode 03 may be a strip. Due to the large area of the strip electrode, the number of the second touch electrodes 03 in the edge region is small, so that the number of the leads connecting the second touch electrodes 03 and the controller is also small. Further, the width of the strip electrode at one end along the extending direction thereof may be greater than the width at the other end, that is, the widths at the two ends of the strip electrode are different. When a user touches different regions of the strip electrode, the electrical signals on the strip electrode collected by the controller are different. In this case, the controller may determine the specific position touched by the user on the strip electrode according to the collected electrical signals, improving the touch accuracy of the second touch electrodes 03 on the premise of reducing the number of leads of the second touch electrodes 03 in the edge region.

In some embodiments, with continued reference to FIG. 3, the widths of the plurality of strip electrodes (i.e. the plurality of second touch electrodes 03) are different at the two ends of each strip electrode. The first strip electrode and the second strip electrode may be two adjacent strip electrodes of the plurality of strip electrodes. The wider end of the first strip electrode is adjacent to the narrower end of the second strip electrode, and the narrower end of the first strip electrode is adjacent to the wider end of the second strip electrode. For example, the edge of the strip electrode may be serrated. When a user's finger simultaneously touches the edges of two adjacent strip electrodes, if the user's finger is located in the right middle of two adjacent strip electrodes, since the edge of the strip electrode is serrated, the touch regions of the user's finger on the two adjacent strip electrodes are different. Therefore, the areas of the touched regions on the two strip electrodes detected by the controller are different, so that the controller can more precisely determine the position touched by the user and further improve the touch accuracy of the second touch electrode 03.

In summary, in the touch panel manufactured by the method for manufacturing a touch panel provided in the embodiments of the present disclosure, the center region of the base substrate is provided with the first touch electrodes, and the edge region of the base substrate is provided with the second touch electrodes, so that electrical signals on the first touch electrodes and the second touch electrodes can be detected respectively. The center region and the edge region of the touch panel in the touch display device have touch functions. Therefore, the embodiments of the present disclosure can at least enrich the functions of the touch display device.

An embodiment of the present disclosure provides a touch display device. The touch display device may include the touch panel shown in FIG. 1, FIG. 2 or FIG. 4.

Figure 12:
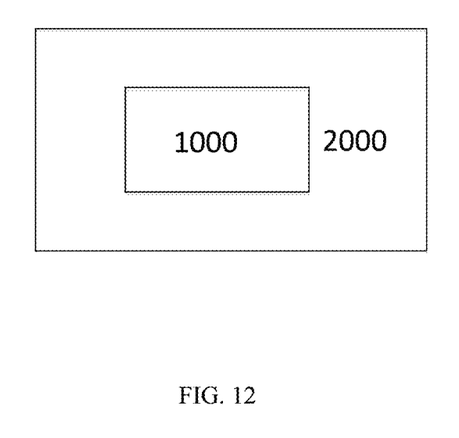
FIG. 12 is a schematic view of a display device provided in an embodiment of the present disclosure.

FIG. 12 is a schematic diagram of a touch display device provided in an embodiment of the present disclosure. The touch display device 2000 of FIG. 12 includes a touch substrate 1000. In the embodiment shown in FIG. 12, the touch substrate 1000 may include the touch panel shown in FIGS. 1, 2, 4, 8, 9, 10 and 11.

The display device may be any product or component having a touch display function such as an electronic paper, a cell phone, a tablet computer, a television set, a display, a notebook computer, a digital photo frame and a navigator.

In summary, in the touch panel of the touch display device provided in the embodiments of the present disclosure, the first touch electrodes are disposed in the center region of the base substrate, and the second touch electrodes are disposed in the edge region of the base substrate, so that the electrical signals on the first touch electrodes and the second touch electrodes can be detected respectively. The center region and the edge region of the touch panel in the touch display device have touch functions. Therefore, the embodiments of the present disclosure can at least enrich the functions of the touch display device.

The embodiment of the touch panel, the embodiment of the method for manufacturing the touch panel and the embodiment of the touch display device in the present disclosure may be referenced to each other, which is not limited in the present disclosure.

The foregoing are only some embodiments of the present disclosure, and are not intended to limit the present disclosure. Within the spirit and principles of the disclosure, any modifications, equivalent substitutions, improvements, etc., are within the scope of protection of the present disclosure.

What is claimed is:

1. A touch panel, comprising:
   a base substrate; and
   first touch electrodes and second touch electrodes that are disposed on the base substrate,
   wherein the first touch electrodes are disposed in a center region of the base substrate, and the second touch electrodes are disposed in an edge region of the base substrate,
   wherein the touch panel further comprises first electrode wires and second electrode wires, the first electrode wires comprising drive wires; and the first touch electrodes comprise drive electrodes and sensing electrodes, and
   wherein the drive electrodes and the drive wires are arranged on a same layer, the second touch electrodes and the second electrode wires are arranged on a same layer, and the sensing electrodes, the drive electrodes and the second electrode wires are respectively arranged on different layers.

2. The touch panel according to claim 1, wherein
   the touch panel further comprises a first transparent insulating layer covering the base substrate and the first touch electrodes, and the second touch electrodes are disposed on the first transparent insulating layer.

3. The touch panel according to claim 1, wherein the second touch electrode is a strip electrode.

4. The touch panel according to claim 3, wherein
the strip electrode has different widths at two ends in the extending direction thereof.

5. The touch panel according to claim 3,
wherein an edge of the strip electrode is serrated.

6. The touch panel according to claim 2, wherein the first touch electrodes and the second touch electrodes are connected to a controller.

7. The touch panel according to claim 6, wherein the touch panel further comprises:
first electrode wires disposed on the base substrate, the first electrode wires connecting the first touch electrodes to the controller; and
second electrode wires disposed on the base substrate, the second electrode wires connecting the second touch electrodes to the controller.

8. The touch panel according to claim 7, wherein the first touch electrodes comprise drive electrodes and sensing electrodes disposed in a cross-insulated manner;
the first electrode wires comprise drive wires and sensing wires, wherein the drive wires connect the drive electrodes to the controller, and the sensing wires connect the sensing electrodes to the controller; and
the touch panel further comprises a second transparent insulating layer covering the base substrate and the drive electrodes, wherein the sensing electrodes are disposed on the second transparent insulating layer.

9. The touch panel according to claim 1, wherein
the first touch electrode and the second touch electrode contain indium tin oxide; and
the first transparent insulating layer and the second transparent insulating layer contain transparent resin.

10. A method for manufacturing a touch panel, comprising: forming first touch electrodes and second touch electrodes on a base substrate; wherein the first touch electrodes are disposed in a center region of the base substrate, and the second touch electrodes are disposed in an edge region of the base substrate,
wherein the touch panel further comprises first electrode wires and second electrode wires, the first electrode wires comprising drive wires; and the first touch electrodes comprise drive electrodes and sensing electrodes, and
wherein the drive electrodes and the drive wires are arranged on a same layer, the second touch electrodes and the second electrode wires are arranged on a same layer, and the sensing electrodes, the drive electrodes and the second electrode wires are respectively arranged on different layers.

11. The method according to claim 10, wherein
forming the first touch electrodes and the second touch electrodes on the base substrate comprises:
forming the first touch electrodes in the center region of the base substrate;
forming a first transparent insulating layer on the first touch electrodes and the base substrate; and
forming the second touch electrodes on the first transparent insulating layer in the edge region of the base substrate.

12. The method according to claim 11, wherein the second touch electrode is a strip electrode.

13. The method according to claim 12, wherein
the strip electrode has different widths at the two ends in the extending direction thereof.

14. The method according to claim 12, further comprising forming a controller, wherein the first touch electrodes and the second touch electrodes are connected to the controller.

15. The method according to claim 14, wherein forming the first touch electrodes in the center region of the base substrate comprises:
forming the first touch electrodes and first electrode wires on the base substrate, the first touch electrodes being connected to the controller through the first electrode wires; and
forming the second touch electrodes on the first transparent insulating layer in the edge region of the base substrate comprises:
forming the second touch electrodes and second electrode wires on the first transparent insulating layer, the second touch electrodes being connected to the controller through the second electrode wires.

16. The method according to claim 15, wherein
the first touch electrodes comprise drive electrodes and sensing electrodes disposed in a cross-insulated manner; and
the first electrode wires comprise drive wires connecting the drive electrodes to the controller and sensing wires connecting the sensing electrodes to the controller; and
forming the first touch electrodes and the first electrode wires on the base substrate comprises:
forming the drive electrodes and the drive wires on the base substrate;
forming a second transparent insulating layer on the drive electrodes and the drive wires; and
forming the sensing electrodes and the sensing wires on the second transparent insulating layer.

17. A touch display device, comprising a touch panel wherein the touch panel comprises:
a base substrate; and
first touch electrodes and second touch electrodes that are disposed on the base substrate,
wherein the first touch electrodes are disposed in a center region of the base substrate, and the second touch electrodes are disposed in an edge region of the base substrate,
wherein the touch panel further comprises first electrode wires and second electrode wires, the first electrode wires comprising drive wires; and the first touch electrodes comprise drive electrodes and sensing electrodes, and
wherein the drive electrodes and the drive wires are arranged on a same layer, the second touch electrodes and the second electrode wires are arranged on a same layer, and the sensing electrodes, the drive electrodes and the second electrode wires are respectively arranged on different layers.

18. The touch panel according to claim 8, wherein
the drive electrodes and the drive wires are disposed in the same layer, the sensing electrodes and the sensing wires are disposed in the same layer, and the second touch electrodes and the second electrode wires are disposed in the same layer.

19. The method according to claim 11, wherein
the first touch electrode and the second touch electrode contain indium tin oxide; and
the first transparent insulating layer and the second transparent insulating layer contain transparent resin.

20. The method according to claim 13, wherein an edge of the strip electrode is serrated.

* * * * *